(12) United States Patent
Balatsos et al.

(10) Patent No.: US 7,925,136 B2
(45) Date of Patent: Apr. 12, 2011

(54) METHOD AND APPARATUS FOR RECORDING INFORMATION IN BATTERY OPERATED DEVICES

(75) Inventors: Aris Balatsos, Toronto (CA); Zeeshan Syed, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 1326 days.

(21) Appl. No.: 11/420,283

(22) Filed: May 25, 2006

(65) Prior Publication Data

US 2007/0274245 A1    Nov. 29, 2007

(51) Int. Cl.
*H04N 5/77* (2006.01)
(52) U.S. Cl. .................... 386/224; 386/328; 386/356
(58) Field of Classification Search ............ 386/46, 386/95, 107, 112, 117
See application file for complete search history.

(56) References Cited

U.S. PATENT DOCUMENTS

| | | | |
|---|---|---|---|
| 5,579,339 | A | 11/1996 | McClaughry |
| 5,949,484 | A | 9/1999 | Nakaya et al. |
| 6,493,326 | B1 | 12/2002 | Ramachandran |
| 6,603,814 | B2 | 8/2003 | Clark et al. |
| 6,876,393 | B1 * | 4/2005 | Yokonuma .................. 348/372 |
| 6,903,778 | B1 * | 6/2005 | Kaku .......................... 348/372 |
| 7,110,025 | B1 * | 9/2006 | Loui et al. ................ 348/220.1 |
| 2005/0213665 | A1 * | 9/2005 | Kyusojin ................ 375/240.25 |
| 2006/0005058 | A1 | 1/2006 | Chen et al. |

FOREIGN PATENT DOCUMENTS

| | | |
|---|---|---|
| EP | 1581007 | 9/2005 |
| FR | 2827054 | 1/2003 |
| JP | 2000-069556 | 3/2000 |
| JP | 2000-174696 | 6/2000 |

OTHER PUBLICATIONS

International Search Report—PCT/IB2007/001442, International Search Authority—European Patent Office, Nov. 7, 2007.
Written Opinion—PCT/IB2007/001442, International Search Authority—European Patent Office, Nov. 7, 2007.
International Preliminary Report on Patentability—PCT/IB2007/001442, The International Bureau of WIPO—Geneva, Switzerland, Nov. 27, 2008.

\* cited by examiner

*Primary Examiner* — Huy T Nguyen
(74) *Attorney, Agent, or Firm* — John G. Rickenbrode

(57) ABSTRACT

A technique for recording information in a battery operated device is provided such that quality level of the recorded information may be changed "on the fly." In one embodiment, while persistently recording information at a first quality level, the battery operated device may, in response to an input a desire or need to change recording quality level, thereafter persistently record the information at a second quality level different from the first quality level, without interrupting the continuity of the recording session. In a presently preferred embodiment, the information being recorded may comprise video information or audio information. Subsequent inputs indicating the need to change recording quality level yet again may also be received thereby causing the battery operated device to persistently record the information at yet another quality level, which quality level may be the same as the first quality level.

12 Claims, 4 Drawing Sheets

METHOD AND APPARATUS FOR RECORDING INFORMATION IN BATTERY OPERATED DEVICES

FIELD OF THE INVENTION

The present invention relates generally to communication systems comprising at least one battery operated device and, in particular, to techniques for recording information in such devices.

BACKGROUND OF THE INVENTION

Battery operated communication devices are well known in the art. Such devices may comprise, for example, cellular telephones, personal digital assistants, digital cameras, digital camcorders or even laptop computers. As such devices have evolved, the quantity and quality of information, particularly audio and/or video information, that may be recorded on such devices has dramatically increased. For example, it is quite common for current digital camcorders to have the capacity to store hours worth of audio and video information.

With the increased capability of such devices, there's has been a commensurate increase in the power and storage demands placed upon such devices. That is, in order to provide the improved performance characteristics, for example, the amount of processing or computing power available in such devices has been commensurately increased. As a result, greater power consumption occurs. To address this situation, longer lasting batteries having greater storage capacity have been created. However, there are limits to the improvements available through battery technologies. Other techniques are necessary if battery operated devices are to be able to keep up with the power demands of ever more capable user applications.

Other techniques for reducing power supply consumption in battery operated devices are known, particularly for devices that perform encoding of various media types. For example, U.S. Pat. No. 6,493,326 discloses a technique which lowers the encoding rate of a variable rate voice coder in response to reduced voice activity by a user of the device. In this manner, the circuitry necessary to transmit the voice data is energized less frequently, thereby resulting in reduced power consumption. In a similar vein, Japanese Published Patent Application No. 2000-174696 teaches a system in which the voltage of a battery is monitored to determine when the voltage falls below a certain threshold. When this occurs, the rate of voice encoding is decreased, e.g. to half rate or less, such that the time required to transmit voice data is similarly decreased. Once again, power consumption of the battery operated device may be reduced. Further still, Published Japanese Patent Application No. 2000-069556 describes a system in which an encoding rate upper limit for a voice encoder is set by a user of the device. When a power saving mode is entered, preferably through actuation of a input mechanism by a user of the device, the encoding rate of the voice encoder is limited by the previously established upper limit. Each of the above-described techniques limits power usage by reducing the rate of encoding activities performed by the battery operated device. However, the above-described references do not address the situation where the battery operated device additionally records the encoded information.

With further regard to recording information, the quantity of recorded information that may now be stored on battery operated devices has risen significantly in recent years, due in part to the improved capacity of memory or storage devices. Notwithstanding this improvement, the demand to be able to record ever increasing quantities of information on battery operated devices has not abated. For example, current digital camcorders allow users to select different encoding modes that provide different qualities of recorded information. Typically, lower quality encoding provides the opportunity to record more information; higher quality encoding provides less opportunity to record information. Regardless, the ability to select encoding (quality) levels is typically done at the beginning of a recording session, and encoding proceeds at the selected level throughout the recording session. It would be advantageous to provide a technique that addresses the need for controlling power consumption in battery operated devices while simultaneously providing greater control over recording quality selection and, hence, memory usage. It would be further advantageous to provide a technique that addresses the need for controlling power consumption in battery operated devices while decoding recorded information.

BRIEF DESCRIPTION OF THE DRAWINGS

The features of the present invention are set forth with particularity in the appended claims. The invention itself, together with further features and attendant advantages, will become apparent from consideration of the following detailed description, taken in conjunction with the accompanying drawings. One or more embodiments of the present invention is now described, by way of example only, with reference to the accompanying drawings wherein like reference numerals represent like elements and in which:

DETAILED DESCRIPTION OF THE PRESENT EMBODIMENTS

Figure 1:
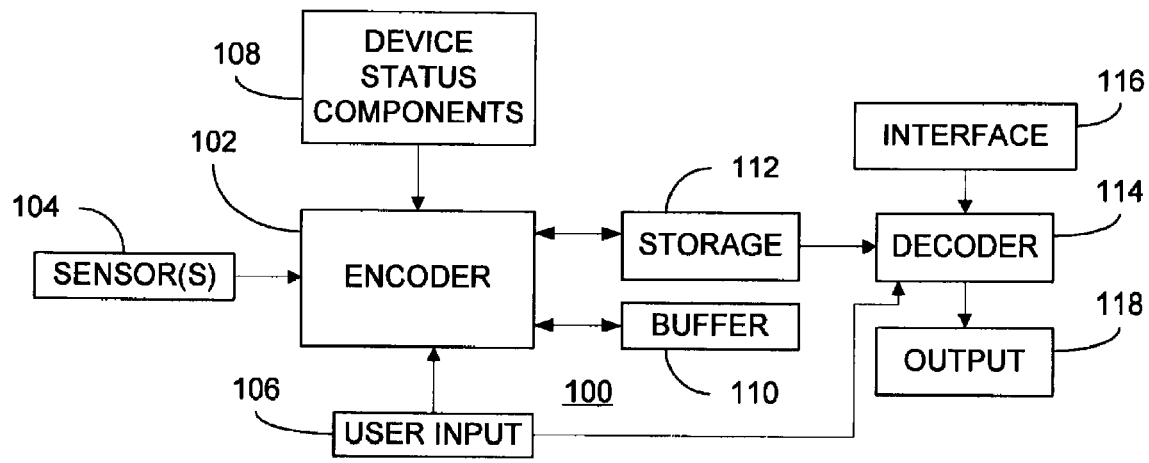
FIG. 1 is a schematic block diagram of a battery operated device in accordance with the present invention.

Briefly, the present invention provides a technique for recording information in a battery operated device such that quality level of the recorded information may be changed "on the fly." In one embodiment of the present invention, while persistently recording information at a first quality level, a battery operated device may receive an input indicating the need to change recording quality level. In response to the input, the device may thereafter persistently record the information at a second quality level different from the first quality level, without interrupting the continuity of the recording session. In the context of the present invention, to "record" information is to persistently store the information for later recall, as opposed to "buffering" of information wherein the information is temporarily stored. In a presently preferred embodiment, the information being recorded may comprise video information or audio information, although the present invention is not limited in this regard. Subsequent inputs indicating the need to change recording quality level yet again may also be received thereby causing the battery operated device to persistently record the information at yet another quality level, which quality level may be the same as the first quality level.

In another embodiment of the present invention, information is temporarily buffered at a highest quality level and subsequently recorded at a lower quality level. Responsive to an input, the information is thereafter recorded at a higher quality level while buffering of the information at the highest quality level continues. Once again, the changes in quality level occur without interrupting the continuity of the current recording session, and subsequent inputs may cause recording of the buffered high quality information to be performed at other quality levels as needed. In this manner, the present invention provides the ability to persistently record information at various quality levels as desired or necessary.

In another embodiment of the present invention, recorded information comprising data supporting multiple decoded information quality levels may be decoded in a manner that is responsive to an input from a status-indicating component of a battery operated device. While decoding at least a first portion of the recorded information to provide decoded information at a first quality level, the input causes the device to decode at least a second portion of the recorded information to provide decoded information at a second quality level. Once again, subsequent inputs may cause further changes in the quality level of the decoded information.

A battery operated device in accordance with the present invention may comprise at least one information sensor coupled to an encoder that encodes information provided by the information sensor(s). Prior to receiving an input as described above, the encoder encodes the information at a first quality level and, subsequent to receiving the input, continues encoding the information at a second quality level different from the first quality level. A storage device, coupled to the encoder, persistently stores both the first quality level encoded information and a second quality level encoded information in a single data structure corresponding to the current recording session. A buffer, coupled to the encoder, may also be provided for temporary storage of either unencoded or encoded information that has been processed at the highest quality level.

In yet another embodiment, the battery operated device may comprise a decoder that receives recorded information from a source. The recorded information may comprise data supporting multiple decoded information quality levels. The decoder operates decode at least a first portion of the recorded information to provide decoded information at a first quality level. Upon receiving an input from a status-indicating component, the decoder thereafter decodes at least a second portion of the recorded information to provide decoded information at a second quality level.

Further still, the present invention describes a data structure in which information, in a first portion of the data structure, is represented by first quality level encoded information and, in at least a second portion of the data structure, is represented by second quality level encoded information.

Referring now to FIG. 1, a battery operated device 100 in accordance with the present invention is further illustrated. The battery operated device 100 comprises an encoder 102 coupled to one or more sensors 104. Furthermore, one or more user inputs 106 are coupled to the encoder 102, as well as one or more devices status components 108. Finally, a buffer 110 and storage 112 are also in communication with the encoder 102. Note that the depiction of the battery operated device 100 of FIG. 1 is for illustrative purposes only and such devices will, in practice, comprise a variety of other components not shown for ease of illustration.

The encoder 102 may comprise any mechanism capable of converting raw, unencoded information received from the one or more sensors 104 into a format (at different, selectable encoding rates or qualities) suitable for persistent storage in the storage device 112. For example, where the sensor 104 comprises an image sensor, such as a complementary metal oxide semiconductor (CMOS) or charge coupled device (CCD) image sensor, the encoder 102 may comprise known software and/or hardware components implementing any of a variety of known video encoding/compression techniques such as those described in the Moving Picture Experts Group (MPEG) standards. Alternatively, where the sensor 104 comprises a microphone or similar audio recording device, the encoder 102 may comprise software and/or hardware elements used to implement any of a variety of known audio compression schemes such as MPEG-1 Audio Layer 3 (MP3) compression. Those who have an ordinary skill in the art will recognize that the present invention is not limited by particular implementation of encoding technologies used beyond the ability to select various encoding rates. Generally, the encoder 102 may be implemented using any known techniques, for example, a processor (e.g., a microprocessor, microcontroller, digital signal processor, etc. or combination thereof) operating under the control of executable instructions stored in a suitable storage device (e.g., volatile and/or non-volatile memory). Alternate implementations, such as a programmable logic array (PLA) or an application specific integrated circuit (ASIC), may be equally employed.

Both the user input devices 106 and device status components 108 may be used to indicate to the encoder 102 the need or desire to change the recording quality level used by the encoder 102. For example, the user input devices 106 may comprise any mechanism for providing user input, such as one or more buttons, a keyboard, a menu-driven display, a voice recognition interface, etc. Using these or other mechanisms known to those having skill in the art, a user of the battery operated device 100 may signal a desire to change recording quality levels. For example, where the battery operated device comprises a digital camcorder, a user of the device 100 may choose to record a given event (e.g., during a continuous recording session) at a relatively low quality level in order to conserve storage and power resources. However, during recording of the event at the relatively low quality level, the user may decide that a certain portion of the event requires further recording at a higher quality level. Using the one or more user input devices 106, the user may manifest this intent to the encoder 102.

In a similar vein, the one or more device status components 108 may provide an input to the encoder 102 indicative of a need to change recording quality level based on a particular status parameter of the battery operated device 100. To this end, the status components 108 may comprise any device capable of measuring or otherwise assessing a parameter of interest concerning the battery operated device 100. For example, and in a presently preferred embodiment, the status component 108 may comprise a power monitor coupled to a power source (e.g., a battery, not shown) of the device 100. In one embodiment, the power monitor ensures that power levels are at a sufficient level to run an application in the first place, and that sufficient total energy reserves are available to meet future requirements using known power reserve prediction techniques (e.g. emergency talk time on a cell phone). In this case, when the power monitor determines that the operational status of the power source has degraded beyond a predetermined threshold (e.g., the voltage or current output of the battery has fallen below threshold values, or the total energy reserved has decreased below a threshold), an indication of this fact can be provided by the power monitor to the encoder 102, thereby causing the encoder 102 to change (presumably reduce) the encoding quality level without interrupting the current recording session. Ideally, it is preferable to predict far enough in advance such that the device can gracefully degrade the quality before shutting down recording operations altogether. Alternatively, the status components 108 may comprise environmental sensors that sense various parameters, such as temperature, vibration, humidity, or any other environmental parameter concerning the device 100, operating in substantially the same manner. Those having skill in the art will appreciate that various status components 108 may be employed and that any of a variety of techniques for providing input from the components 108 to the encoder 102 may be used as a matter of design choice.

As noted above, the present invention draws a distinction between buffering of information and recording information. Buffering, as used herein, describes the act of temporarily storing information, for example, for further processing or prior to persistent storage. On the other hand, recording, as used herein, refers to the act of persistently storing information for later recall. Components supporting this distinction are further illustrated in FIG. 1 in the form of the buffer 110 and storage 112. The buffer 110 may comprise any suitable storage device, such as random access memory (RAM), an array of hardware registers or any other suitable storage mechanism as known in the art. Typically, the buffer 110 will comprise a relatively small amount of storage (albeit, a useful quantity) as compared to the storage device 112. As noted above, the purpose of the buffer 110 is to temporarily store information that is being operated upon or otherwise processed by the encoder 102. Conversely, the storage device 112, which may also comprise RAM, a magnetic disc drive, or any other suitable persistent, non-volatile storage device, provides for persistent storage and later recall of information (preferably encoded by the encoder 102). Encoding data prior to writing the persistent storage 112 can increase recording capacity of the persistent storage 112 as well as reduce the bandwidth-bottleneck and higher power cost commonly associated with persistent storage. Once again, various implementations of the buffer 110 and storage 112 within the scope of the present invention will be apparent to those having skill in the art.

FIG. 1 also illustrates additional elements that may be used for decoding of recorded information. In particular, a decoder 114 is provided that may receive recorded information from either the storage 112 or an interface 116 and, after performing decoding operations on the recorded information, provide decoded information to one or more output devices 118. As in the case of the encoder 102, the decoder 114 may be implemented using any known techniques, for example, a processor operating under the control of executable instructions stored in a suitable storage device, a PLA or ASIC. The decoder 114 typically performs inverse operations relative to the encoding operations performed by the encoder 102. Generally, this entails taking encoded, recorded information (which may have been encoded and recorded at different bit rates) and converting it to a (typically) uncompressed format that may be readily provided to an output device 118 for conversion to a human-understandable format. For example, where the recorded information is video information that has been encoded using an MPEG format, the decoder 114 operates upon the encoded MPEG data and converts it to pixel data that may be output to a suitable display. Once again, the particular type of information operated upon and the form of encoding (and, hence, decoding) used by the present invention is a matter of design choice and the principles of the present invention may apply equally to any forms thereof.

The interface 116 may comprise any component or groups of components suitable for providing recorded information to the decoder 114. For example, the interface 116 may comprise a computer network interface, such as an Ethernet interface, thereby allowing access to recorded information stored within a computer network; a physical media interface, such as an optical (e.g, a digital video disc interface) or magnetic memory interface; an auxiliary device interface, such as an S-video interface allowing connection to digital video recorders, digital camcorders, etc.; or even a wireless interface, such as a wireless modem or cellular telephone receiver. In particular, and as described in further detail below, the interface 116 preferably supports the ability to provide MPEG-encoded information comprising "multi-rate" data, although the present invention is not limited in this regard.

The one or more output devices 118 may comprise any mechanism suitable for converting the decoded information provided by the decoder 114 to a human-understandable form. For example, for video or still image information, the output 118 may comprise a suitable display screen; for audio information, the output 118 may comprise a speaker. Once again, the present invention is not limited to any one particular implementation of the output 118. Additionally, as shown in FIG. 1, the user inputs 106 may also be coupled to the decoder 114, thereby allowing input information to control operation of the decoder 114.

Figure 2:
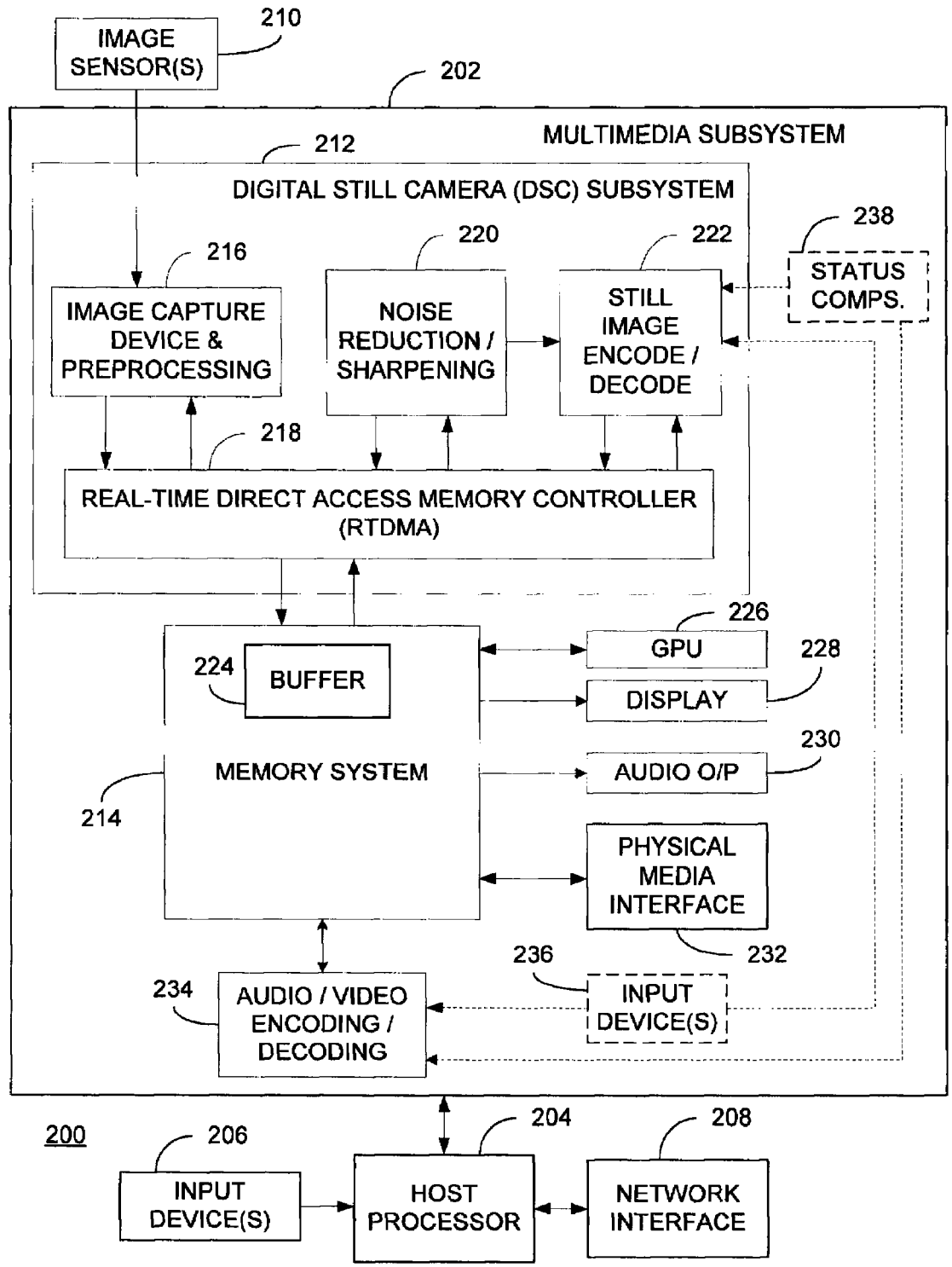
FIG. 2 is a schematic block diagram of a battery operated device incorporating an exemplary hardware configuration suitable for implementing various embodiments of the present invention.

Referring now to FIG. 2, a schematic block diagram of a battery operated device 200 incorporating an exemplary hardware configuration suitable for implementing various embodiments of the present invention is shown. Generally, the device 200 comprises one or more image sensors 210 in communication with a multimedia subsystem 202 and, more particularly, a digital still camera (DSC) subsystem 212. The DSC subsystem 212 communicates with a memory system 214 suitable for use in performing video/image processing operations of the type described herein. As further illustrated in FIG. 2, a graphics processing unit (GPU) 226, a display 228, and an audio/video encoding/decoding component 234 also communicate with the memory system 214. In general, the image sensors 210, such as CMOS or CCD sensors, are used to provide raw image data (in the form of a plurality of streaming pixels) to the DSC subsystem 212, which, in turn, processes the raw image data and stores the resulting processed image data in the memory system 214. Thereafter, the processed image data is available for further processing by the GPU 226 or the audio/video encoding/decoding component 234. Alternatively, the processed image data may be provided to the display 228 for display to a user of the device 202.

In a typical implementation, the multimedia subsystem 202 communicates with an application or host processor 204, which in turn may communicate with input devices 206 and/or a network interface 208. The input devices 206 may be as described above with reference to FIG. 1 and communicate with the multimedia subsystem 202, and particularly the encoding components found therein, via the host processor 204, which may itself any suitable microprocessor, microcontroller, digital signal processor, etc. or combinations thereof operating under the control of executable instructions stored in one or more suitable memory devices (not shown). Additionally, the network interface 208 allows the device 200 to communicate with a communication network such as a wireless network (e.g., a cellular telephone network) or a computer network (e.g., a local area network or public computer network, such as the World Wide Web). Other devices commonly used in the art (e.g., other physical media interfaces) may operate in conjunction with the host processor 204 and the present invention is not limited in this regard.

As further illustrated in FIG. 2, the DSC subsystem 212 may include various other components. More particularly, the raw image data provided by the image sensors 210 is provided to an image capture and preprocessing block 216. As known in the art, the image capture and preprocessing block 216 performs any preprocessing that may be needed. Such preprocessing may include various correction operations, such as bad pixel detection and correction, to compensate for known limitations of the image sensors, corresponding optics, etc. Data output by the image capture and preprocessing block 216 is provided to the memory system 214 via a real time direct access memory controller (RTDMA) 218. Once stored in the memory system 214, the image data may be further operated upon by a noise reduction/sharpening component which likewise accesses memory system 214 via the RTDMA 218. Image data filtered by the noise reduction/sharpening component 220 is thereafter also provided to the memory system 214. Finally, a Joint Photographic Experts Group (JPEG) (MJPEG) encode/decode block 222 may also access image data stored in the memory system 214 (whether filtered or not) via the RTDMA 218. Of course, the preprocessed image data, filtered image data or any other image data stored in the memory system 214 may be accessed by the audio/video encoding/decoding component 234 or display 228. Further still, audio processing components (not shown) may provide encoded/compressed audio information to the memory system 214, which audio information may be provided to an audio output interface 230, such as speaker driver circuitry, etc. Similarly, any data (whether video, audio, still image, graphics, etc.) stored in the memory system 214 may be provided to a physical media interface 232, such as a non-volatile memory drive, universal serial bus (USB) port, etc.

As further shown in FIG. 2, user input devices 236 and device status components 238, as previously described, may optionally interface directly with various components within the DSC 212 and/or the multimedia subsystem 202. In particular, the user input devices 236 and device status components 238 can interact directly with the information encoding functionality embodied in the encode/decode block 222 or audio/video encoding/decoding component 234.

A wide variety of devices may incorporate, or otherwise benefit from use of, the present invention. For example, digital cameras, digital camcorders or any other image capture devices may employ processing in accordance with the present invention. Additionally, devices within a wireless communication system may incorporate or otherwise benefit from the present invention. Devices within wireless communication systems may include wireless handsets, such as cellular telephones or handheld radios, as well as network infrastructure equipment, such as base stations, switches, routers, etc. Each of these devices may serve as a receiver of information (e.g., video, audio, etc.) that has been processed in accordance with the techniques described herein. For example, a particular element within a wireless network infrastructure may receive video information from wireless devices that perform the processing described herein. Alternatively, network elements, or even other wireless communication devices, may simply transmit and receive information that was processed elsewhere, by other devices, in accordance with the present invention.

Figure 3:
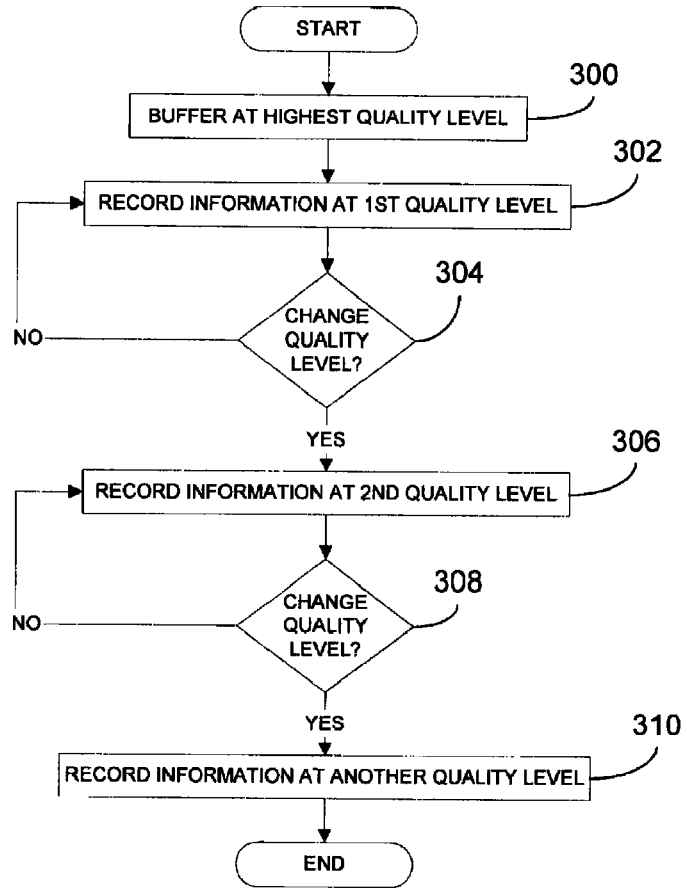
FIG. 3 is a flowchart illustrating processing by a battery operated device in accordance with an embodiment of the present invention.

Referring now to FIG. 3, processing in accordance with an embodiment of the present invention is illustrated. In particular, the processing illustrated in FIG. 3 may be performed by a battery operated device as described above relative to FIGS. 1 and 2. At block 300, the battery operated device buffers information to be recorded at a highest quality level. For example, raw information provided by a sensor (e.g., sensor 104) may be temporarily stored in the buffer 110 before or during encoding. Alternatively, interim encoding results or even fully encoded information could be buffered prior to persistent storage. Regardless, the buffering occurring at block 300 is preferably for information that is represented at a highest quality level. This is done because the encoding process is often "lossy", meaning that encoding performed at a lower quality level irreversibly degrades the quality of the encoded information. Conversely, information, encoded or otherwise, represented at a highest quality level, can be recorded at the highest quality level or at lower quality levels as desired. Thus, in a presently preferred embodiment of the processing illustrated in FIG. 3, information to be recorded is continually buffered at a highest quality level.

At block 302, the battery operated device records the buffered information at a first quality level. The first quality level could be equivalent or less than the highest quality level. For example, while recording an event using a digital camcorder, a user may decide to use only a medium quality level to record the information. In this case, the information is preferably first buffered at the highest quality level and thereafter recorded at the lesser (medium) quality level selected by the user.

While continuing to record the information at the first quality level, a determination is made at block 304 whether a need to change quality level of the recorded information has been detected. As described above, this determination is preferably made based on detection of an input, either from a user of the device or from the device itself. This process of recording information at the first quality level and continuously checking to determine whether a change in recorded quality level is desired or required continues indefinitely until such time as a need to change quality level is detected at block 304.

Thereafter, at block 306, the information is recorded at a second quality level different from the first quality level. Note that the second quality level may be better than the first quality level or, conversely, the first quality level could be better than the second quality level. Regardless of whether the change in quality level is for the better or worse, the desired or required change in quality level is preferably explicitly indicated in the input leading to the change in quality level, or inherent in the nature of the input.

As noted above with reference to block 300, buffering, preferably at the highest quality level, is employed. However, in an alternate embodiment, buffering can be avoided altogether through dynamic control of the information sensor itself. The ability to control the quality level of output directly from information sensor is know in the art. For example, the native resolution of a CCD image sensor can be reduced or increased by altering the bining (combining) factor for analog pixel data on-the-fly before sending image data out of the pixel data amplifiers. As described above, buffering occurs at a highest quality level and changes to the quality level of subsequently recorded information are controlled through the encoder. In this alternate embodiment, however, changes to the quality level of recorded information is controlled through the information sensor. That is, the quality level of the unencoded information may be dynamically controlled as needed, thereby providing unencoded information of a lower or higher quality level, typically correlating to higher or lower bit rates and, in the latter case, lower power consumption. For example, in the case of a digital camera or camcorder, the processing of block 300 may be avoided and the unencoded information, i.e., image or video information, provided by the image sensor at the highest or some other quality level. The encoder thereafter encodes this information as necessary. However, when the change in quality level is necessary or desired, the information sensor is instead controlled to alter the quality of the unencoded information, e.g., the bit rate of the unencoded information is decreased or increased. Assuming the quality level of the encoded information is proportional to the quality level of the unencoded information, the encoder can operate as before and simply encode whatever input it is provided. This alternative embodiment provides the opportunity for enhanced power savings by eliminating the need for a buffer.

Regardless, processing continues in this manner until, at block 308, it is determined whether yet another change in quality level is desired or required. If an input indicating such a change is detected at block 308, processing continues at block 310 where the information is recorded at another quality level, which quality level may be the same as the first quality level or yet another quality level altogether. Note that the present invention is not limited to two quality levels and, in practice, may comprise any of a number of quality levels as a matter of design choice.

Figure 4:
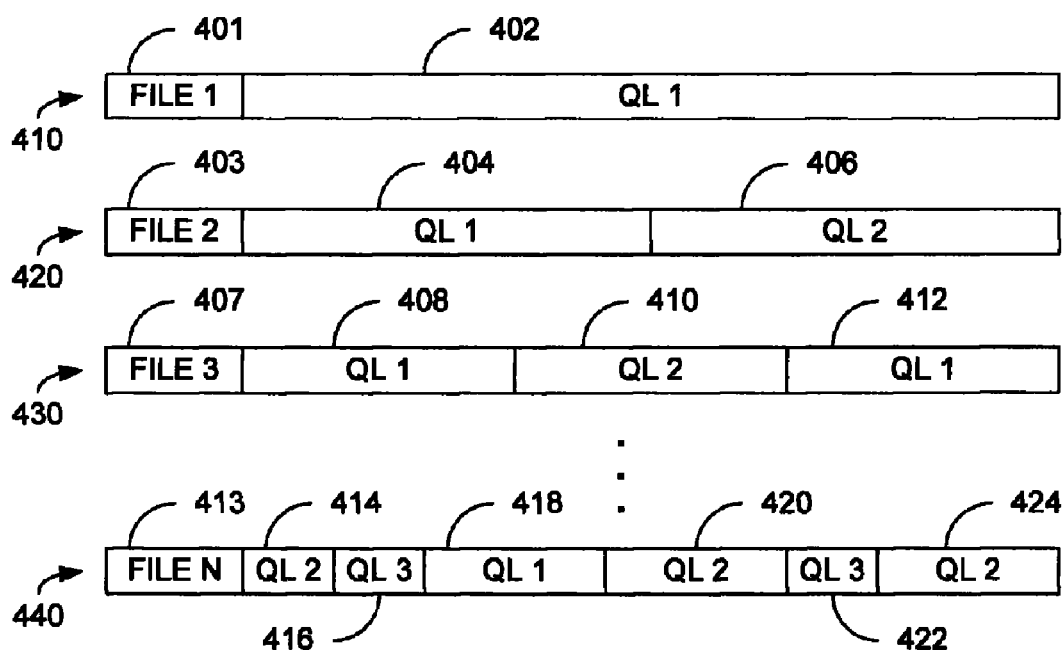
FIG. 4 is a schematic illustration of exemplary data structures in accordance with the present invention.

Data structures in accordance with the present invention are further illustrated with reference to FIG. 4. In particular, FIG. 4 illustrates a machine readable medium 400 having stored thereon a plurality of data structures 410, 420, 430, 440. In the embodiment shown, each data structure comprises a header 401, 403, 407, 413 that includes information identifying the corresponding data structure. Techniques for creating such data structures on machine readable media, such as magnetic or optical storage devices, are well known in the art. Each data structure also includes one or more storage portions for storing encoded information at varying quality levels, which information is representative of corresponding portions of streaming information. As used herein, the streaming information comprises information from a single recording session during which more than one encoding quality level may be employed.

For example, a first data structure 410 comprises a single storage portion 402 storing information at a first quality level, labeled QL1. In essence, the first data structure 410 is like any other data structure that results from recording information using typical prior art devices. A second data structure 420, however, comprises two storage portions 404, 406 each comprising information recorded at different quality levels, in this example, labeled QL1 and QL2. A third data structure 430 illustrates another example in which three storage portions 408, 410, 412 are used to store information recorded at two quality levels. Note that, in this case, the middle storage portion 410 comprises information stored at the second quality level interleaved with the other storage portions 408, 412 storing information recorded at a first quality level. A fourth data structure 440 illustrates yet another example in which a plurality of storage portions 414 through 424 are used to store information recorded at three different quality levels, labeled QL1, QL2 and QL3. Once again, note that the quality level of the recorded information can vary back and forth as desired or required.

Figure 6:
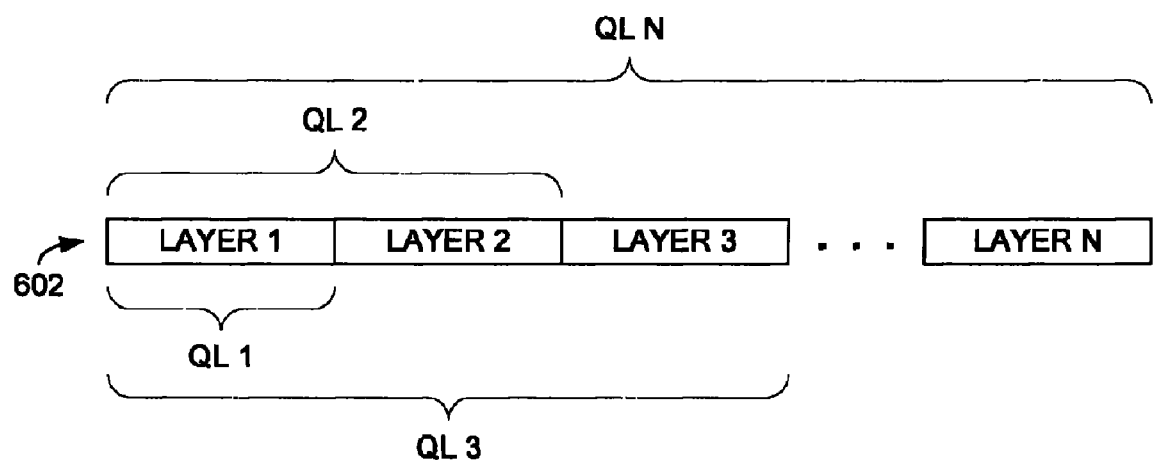
FIG. 6 is a schematic illustration of exemplary recorded information that may be employed in the other embodiment of FIG. 5.
Figure 5:
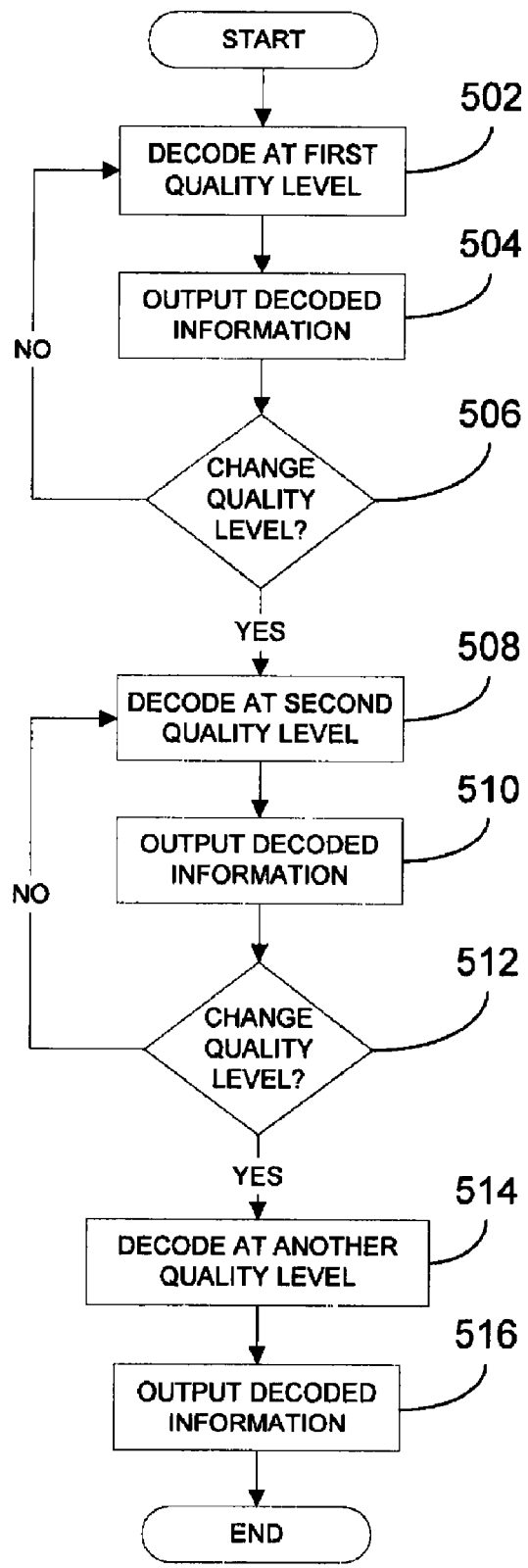
FIG. 5 is a flowchart illustrating processing by a battery operated device in accordance with another embodiment of the present invention.

Referring now to FIG. 5, processing in accordance with another embodiment of the present invention, particularly a decoding embodiment, is illustrated. The processing illustrated in FIG. 5 may be performed by a battery operated device as described above relative to FIGS. 1 and 2. In particular, the processing illustrated in FIG. 5 is particularly suited to recorded information that comprises data supporting more than one decoded information quality level. For example, in the case of the MPEG video encoding standard defines the concept of "multi-rate" stream that can store multiple data rates in a file format that allows hardware to decode data suitable for different quality profile levels. As another example, U.S. Pat. No. 6,603,814 issued to Clark et al. discloses a wavelet compression scheme suitable for providing so-called "embedded" streams wherein all data corresponding to lower data rates is provided at the beginning of the stream. That is, as the encoder compresses data, that data comprising the greatest or most significant informational content is output first. As the compression continues, additional information content is added to the output stream, further refining the overall quality of the compressed video data. A schematic illustration of the types of recorded information described above is illustrated in FIG. 6. As shown there, recorded information 602 comprises a plurality of "layers", in this case labeled 1 through N. Although a particular format is illustrated in FIG. 6, those having skill in the art will appreciate that other formats may be equally employed. Furthermore, the particular content of each layer will depend on the particular encoding scheme used. Regardless, each additional layer, when decoded, improves the quality of the decoded information. For example, as shown, decoding of the first layer (Layer 1) results in decoded information of a first quality level (QL 1); decoding of the first two layers (Layer 1 and 2) results in decoded information of a second quality level (QL 2>QL 1); decoding of the first three layers (Layer 1-3) results in decoded information of a third quality level (QL3>QL 2>QL 1); and, at the highest quality end, decoding of all layers (Layer 1-N) results in decoded information of an N'th (highest) quality level.

Thus, at block 502, the device decodes at least a first portion of the recorded information to provide, at block 504, decoded information at a first quality level. For example, with reference to FIG. 6, the first portion of the recorded information may comprise all N layers. As described above, the decoded information may thereafter be provided to a suitable output mechanism. At block 506, it is determined whether a change in quality level is necessary. In particular, it is determined whether an input from a status-indicating component of the device has been received, the input being indicative of the need to change quality level of the decoded information. In a presently preferred embodiment, the status-indicating component comprises a power/energy monitor as described above. Thus, for example, as the power/energy of the device's power source decreases, it can be determined at block 506 that quality of the decoded information should be reduced, thereby reducing power consumption.

If it is determined that a change in quality level is necessary, processing continues at block 508 where the device decodes at least a second portion of the recorded information to provide, at block 510, decoded information at a second quality level. For example, again with reference to FIG. 6, the second portion of the recorded information may comprise M (<N) layers, such as Layers 1 and 2 only. Note that the first and second quality levels may be reversed, such that the need to change to the quality levels at block 506 actually indicates a need to improve the quality level. Regardless, given the possibility of further degradation (or improvement) of status as indicated by the status-indicating components, processing may continue at block 512 where it is determined that yet another change in quality level is required. If so, processing continues at block 514 where the device decodes at least another portion of the recorded information to provide, at block 510, decoded information at another quality level. Continuing with the previous example and referring to FIG. 6, the other portion of the recorded information may comprise M+1 (<N) layers, such as Layers 1-3 only; or, the other portion may comprise M−1 (<N) layers, such as Layer 1 only.

As described above, the present invention provides a technique for recording information in battery operated devices, thereby providing greater control over the usage of finite storage capacity and power consumption. This is achieved by allowing encoding of information to be responsive to user or devices inputs indicating a desire or need to change recording quality levels within a recording session. In a decoding embodiment, status of the device (preferably, power/energy status of the device) may also be used to control quality levels of decoded information. For at least these reasons, the present invention represents an advancement over prior art techniques.

It is therefore contemplated that the present invention cover any and all modifications, variations or equivalents that fall within the spirit and scope of the basic underlying principles disclosed above and claimed herein.

What is claimed is:

1. In a battery operated device, a method for recording information, the method comprising:
   persistently recording the information at a first quality level;
   while persistently recording the information at the first quality level, receiving a device status input from a status-indicating component of the battery operated device indicating a need to change recording quality level; and
   responsive to the input, persistently recording the information at a second quality level.

2. In a battery operated device, a method for persistently recording information, the method comprising:
   temporarily buffering the information at a highest quality level to provide buffered high quality information;
   persistently recording the buffered high quality information at a lower quality level;
   while temporarily buffering the information at the highest quality level, receiving a device status input from a component of the battery operated device indicating a need to change recording quality level; and
   responsive to the input, persistently recording the buffered high quality information at a higher quality level.

3. A battery operated device operable to record information, comprising:
   an information sensor that provides streaming unencoded information;
   an input device that provides an input from a status-indicating component of the battery operated device indicating a need to change recording quality level;
   an encoder, operatively coupled to the information sensor and the input device, operable to encode the streaming unencoded information at a first quality level to provide first quality level encoded information and further operable, responsive to the input while encoding at the first quality level, to encode the streaming unencoded information at a second quality level to provide second quality level encoded information; and
   a storage device, operatively coupled to the encoder, operable to persistently store both the first quality level encoded information and the second quality level encoded information as representative of the streaming unencoded information.

4. The device of claim 3, wherein the information sensor further comprises an image sensor.

5. The device of claim 3, wherein the information sensor further comprises an audio sensor.

6. In a battery operated device, a method for decoding recorded information, the recorded information comprising data supporting multiple decoded information quality levels, the method comprising:
   decoding at least a first portion of the recorded information to provide decoded information at a first quality level;
   while providing the decoded information at the first quality level, receiving an input from a status-indicating component of the battery operated device indicating a need to change decoded information quality level, wherein the status-indicating component comprises an environmental sensor configured to sense one or more environmental parameters that include temperature, vibration, and humidity; and
   responsive to the input, decoding at least a second portion of the recorded information to provide decoded information at a second quality level.

7. The method of claim 6, wherein the first quality level is better than the second quality level.

8. The method of claim 6, wherein the second quality level is better than the first quality level.

9. A battery operated device operable to decode recorded information comprising data supporting multiple decoded information quality levels, comprising:
   a source of the recorded information;
   a status-indicating component of the battery operated device, wherein the status-indicating component comprises an environmental sensor configured to sense one or more environmental parameters that include temperature, vibration, and humidity; and
   a decoder, operatively coupled to the source and the status-indicating component, operable to decode at least a first portion of the recorded information to provide decoded information at a first quality level and further operable, responsive to an input received from the status-indicating component while providing the decoded information at the first quality level, to decode at least a second portion of the recorded information to provide decoded information at a second quality level.

10. A non-transitory computer readable storage medium having stored thereon instructions that when executed by a processor of a battery operated device cause the processor to:
    persistently record the information at a first quality level;
    while persistently recording the information at the first quality level, receive a device status input from a status-indicating component of the battery operated device indicating a need to change recording quality level; and
    responsive to the input, persistently record the information at a second quality level.

11. A battery operated device operable to record information, comprising:
- means for sensing and providing streaming unencoded information;
- means for providing an input from a status-indicating component of the battery operated device indicating a need to change recording quality level;
- means for encoding the streaming unencoded information at a first quality level to provide first quality level encoded information and, responsive to the input from the input means while encoding at the first quality level, encoding the streaming unencoded information at a second quality level to provide second quality level encoded information; and
- means for persistently storing both the first quality level encoded information and the second quality level encoded information as representative of the streaming unencoded information.

12. The device of claim 11, wherein the sensing means comprises one or more of an image sensor and an audio sensor.

* * * * *